(12) United States Patent
Ertl et al.

(10) Patent No.: US 7,245,741 B1
(45) Date of Patent: Jul. 17, 2007

(54) METHOD AND DEVICE FOR DETERMINING WHETHER THE INTERIOR OF A VEHICLE IS OCCUPIED

(75) Inventors: Ludwig Ertl, Regensburg (DE); Thorsten Köhler, Deuerling (DE); Dirk Zittlau, Berg (DE)

(73) Assignee: Siemens Aktiengesellschaft, München (DE)

(*) Notice: Subject to any disclaimer, the term of this patent is extended or adjusted under 35 U.S.C. 154(b) by 837 days.

(21) Appl. No.: 10/416,758

(22) PCT Filed: Nov. 14, 2000

(86) PCT No.: PCT/DE00/03995

§ 371 (c)(1),
(2), (4) Date: May 14, 2003

(87) PCT Pub. No.: WO02/40320

PCT Pub. Date: May 23, 2002

(51) Int. Cl.
*G06K 9/00* (2006.01)
(52) U.S. Cl. .................. 382/103; 348/169; 701/45; 180/277; 280/728.1; 280/802
(58) Field of Classification Search .......... 382/100, 382/103, 104, 106, 107; 701/45; 348/169; 180/277; 280/728.1, 802
See application file for complete search history.

(56) References Cited

U.S. PATENT DOCUMENTS

| 4,625,329 | A | * | 11/1986 | Ishikawa et al. ............ 382/104 |
| 5,737,083 | A | * | 4/1998 | Owechko et al. ............ 356/623 |
| 5,967,549 | A | * | 10/1999 | Allen et al. ................. 280/735 |
| 5,983,147 | A | * | 11/1999 | Krumm ........................ 701/45 |
| 6,049,747 | A | * | 4/2000 | Nakajima et al. ............. 701/45 |
| 6,154,559 | A | * | 11/2000 | Beardsley .................... 382/103 |
| 6,200,139 | B1 | * | 3/2001 | Clapper ........................ 434/62 |
| 6,766,036 | B1 | * | 7/2004 | Pryor .......................... 382/103 |
| 6,813,371 | B2 | * | 11/2004 | Kakinami .................... 382/104 |
| 6,961,443 | B2 | * | 11/2005 | Mahbub ...................... 382/100 |

FOREIGN PATENT DOCUMENTS

DE     197 57 595 A1     7/1999

\* cited by examiner

*Primary Examiner*—Vikkram Bali
*Assistant Examiner*—Anand Bhatnagar
(74) *Attorney, Agent, or Firm*—Cohen Pontani Lieberman & Pavane LLP

(57) ABSTRACT

The invention relates to a system for determining whether the interior of a vehicle is occupied. The inventive device comprises image acquisition means (10) for acquiring images of an area of the vehicle interior, an image acquisition data generation unit (14) for generating image acquisition data in which every image point of a three-dimensional surface image is presented as a vector in an acquisition coordinate system of the image acquisition means, and a conversion unit (16) that converts the image acquisition data to vehicle image data. Said vehicle image data describe every image point as a vector in a coordinate system that is specific of the vehicle.

7 Claims, 2 Drawing Sheets

METHOD AND DEVICE FOR DETERMINING WHETHER THE INTERIOR OF A VEHICLE IS OCCUPIED

PRIORITY CLAIM

This is a U.S. national stage of application No. PCT/DE00/03995, filed on Nov. 14, 2000. Priority is claimed on that application.

BACKGROUND OF THE INVENTION

1. Field of the Invention

The invention relates to a method and a device for determining whether the interior of a vehicle is occupied.

2. Description of the Prior Art

Modern vehicles are equipped with occupant protection systems such as airbags, belt tensioners, with voice input devices and other devices, for the optimum function of which precise knowledge of the position of vehicle occupants or other objects in the interior is advantageous. For example it is expedient to tailor the inflation time and/or degree of inflation of an airbag to the position and where appropriate the size of a vehicle occupant to be protected. If there is a child seat on the passenger seat for example, it is expedient not to activate the passenger airbag at all in the event of an accident. It is advantageous with voice input systems to know the position of a speaking vehicle occupant, as the device is advantageously designed so that it does not respond to certain voice commands, if these are not spoken by the driver.

SUMMARY OF THE INVENTION

The object of the invention is to create a method and a device by means of which vehicle occupancy can be reliably identified and simply analyzed.

The object of the present invention is met by a method including first generating image acquisition data relating to an image acquisition mans, which indicates for example the position of object points corresponding to the image points for example in relation to their distance from a camera and their direction in the space. This image acquisition data is converted to vehicle image data, which directly describes the object points corresponding to the image points in a vehicle-specific coordinate system. The image points can then be analyzed directly in the vehicle-specific coordinate system to ascertain whether predetermined conditions exist which are relevant for activation of an airbag, activation of voice commands, etc. These interior occupancy conditions, location and/or size of the head of a person, occupancy or non-occupancy of a seat, presence of a child seat, etc. are stored in data, which relates to the interior of the vehicle, i.e. to a vehicle-specific coordinate system.

Occupancy analysis, which is independent of the distance of the relevant object from the camera, i.e. the position of the image acquisition means within the interior, can be carried by breaking down the area detected by the image acquisition means into volume elements.

A device for achieving the object of the invention comprises an apparatus for determining whether the interior of a vehicle is occupied, the apparatus including an image acquisition device fitted in the interior of a vehicle for acquiring image data in an area of a vehicle interior, the image acquisition means defining an image acquisition coordinate system. An image acquisition data generation unit is connected to the image acquisition means for receiving the image data and generating image acquisition data depicting each image point of the image data as a vector in the image acquisition coordinate system of the image acquisition device. A conversion unit is used for converting the image acquisition data to vehicle image data which depicts each image point of the image data as a vector in a vehicle-specific coordinate system.

The inventive device can be used particularly advantageously in a vehicle occupant protection system.

BRIEF DESCRIPTION OF THE DRAWINGS

The invention is described below using diagrams shown in the figures for example and with further details.

In the drawings.

DETAILED DESCRIPTION OF THE PRESENTLY PREFERRED EMBODIMENTS

Figure 1:
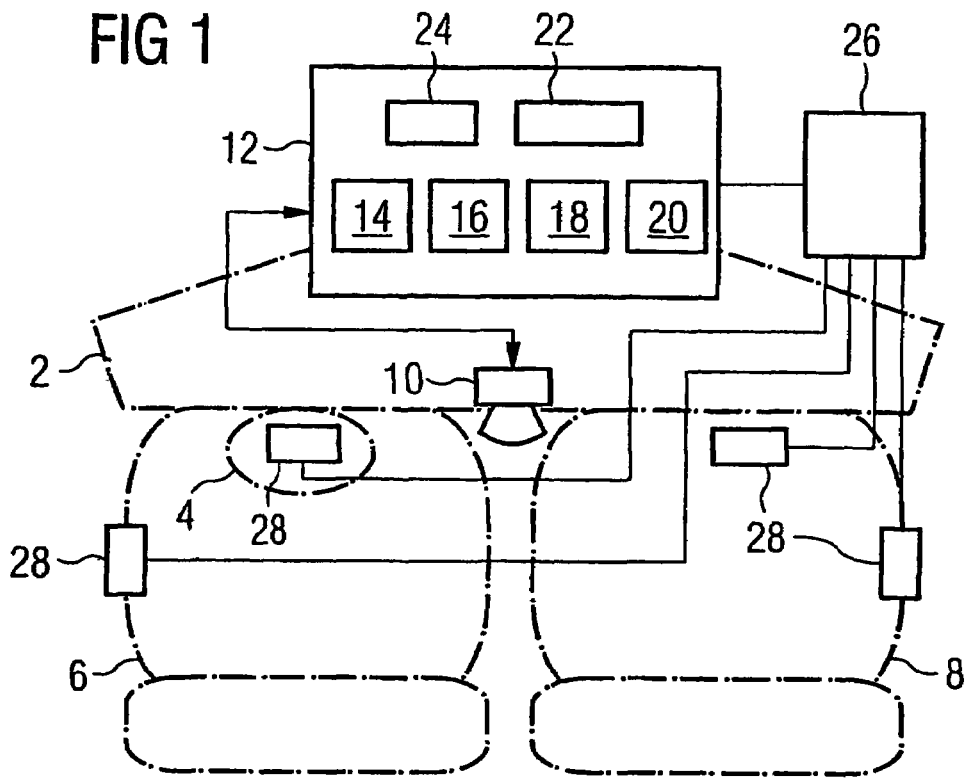
FIG. 1 is a block circuit diagram of a device according to the invention.

According to FIG. 1 an image acquisition device 10, with which a three-dimensional surface image of the vehicle interior in the area of the driving seat and passenger seat can be acquired, is located in the interior of a vehicle in the area above the windshield, with the windshield 2, steering wheel 4, driving seat 6 and passenger seat 8 of the vehicle being indicated with a broken line.

The image acquisition device can, as known, have the widest variety of structures, and may for example be a 3D camera, which operates as a stereo camera or for example a triangulation camera using light pencil methods or some other method. A detailed description of 3D acquisition methods is given in the book by Xiaoyi Jiang, Horst Bunke; Dreidimensionales Computersehen; Gewinnung und Analyse von Tiefenbildern [Three-dimensional computer visuals; Obtaining and analyzing depth images], Springer Berlin, 1997. A number of cameras may be present, which are assigned to the driver space and the passenger space. The cameras may, for example, be pivoted by means of a stepper motor.

The image acquisition device 10 is connected to a control device 12, which contains an image acquisition data generation unit 14, a conversion unit 16, a voxel unit 18, an analysis unit 20, a microprocessor 22 and storage units 24. The units 14, 16, 18 and 20 are essentially functional blocks, which are present in the form of hardware components and/or software depending on the system structure. The control device 12 is connected to a control unit 26, which controls the operation of occupant protection means 28.

Figure 2:
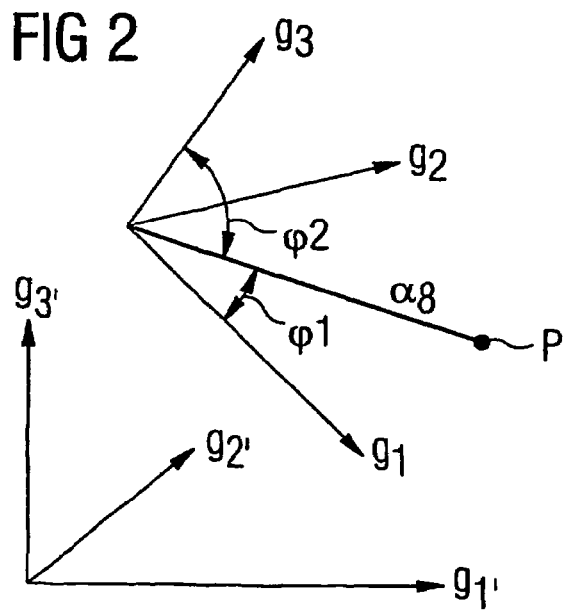
FIG. 2 is a schematic diagram showing different coordinate systems to explain the data conversions in the present invention.

The function of the device in FIG. 1 is described below using FIGS. 2 and 3.

With 3-dimensional surface images, which can be analyzed with a data processing unit, the connecting lines from the two sensors (stereo method) or one sensor and a laser light source (light pencil method) to a surface point on the object are known. After calculating the distances a, there are a number of straight lines or vectors in the image sensor system (one of the image sensors is selected when using stereo methods), which connect the sensor center point to the surface points of the object. Let it be assumed that the image acquisition data generation unit 14 generates a three-dimensional surface image of the relevant area of the interior from the data acquired by the image acquisition device 10, in which each surface point P of an object is assigned its coordinates x, y, z (FIG. 2) in a fixed, rectangular, Cartesian coordinate system relating to the image acquisition device 10. The axes $g_1$, $g_2$, $g_3$ of this coordinate system are for example given by:

$g_1$ optical axis of the lens $g_2$ a straight line, perpendicular to the optical axis $g_1$ in a vertical plane for example and $g_3$ a straight line, perpendicular to $g_1$ and $g_2$.

The origin O of this coordinate system is located for example in the imaging plane of the lens.

The image acquisition data $x_n$, $y_n$, $z_n$ may be generated directly in the image acquisition device 10 or, alternatively, after the image acquisition data generation unit 14 of the control device 12 is converted to Cartesian coordinates of a rectangular Cartesian coordinate system $g_{1'}$, $g_{2'}$, $g_{3'}$ in the conversion unit 16. The Cartesian coordinate system is vehicle-specific, with $g_{1'}$, for example signifying the longitudinal direction of the vehicle, $g_{2'}$, the width direction of the vehicle and $g_{3'}$ the height direction, and the origin O' signifying a fixed point of reference, for example in the area of the center of the vehicle floor.

The position of the image acquisition means-specific coordinate system $g_1$, $g_2$, $g_3$ in relation to the vehicle-specific coordinate system is stored in the storage unit 24 so that the conversion matrix, with which the image acquisition means-specific coordinate system can be transferred to the vehicle-specific coordinate system, is known.

The following general relationships apply to the conversion of two Cartesian coordinate systems to each other:

If it is assumed that a first Cartesian coordinate system with the origin O and the axes $g_1$, $g_2$, $g_3$ is transferred to a second Cartesian coordinate system with the origin O' and the axes $g_{1'}$, $g_{2'}$, $g_{3'}$, by being rotated through an angle $\delta$ about an axis g, the direction cosine of which is given with the coordinate axes by $\cos(g_1, g) = \alpha$, $\cos(g_2, g) = \beta$ and $\cos(g_3, g) = \gamma$, then the following relationship applies to the conversion of the coordinates:

$$x' = x(\cos\delta + \alpha^2(1-\cos\delta)) + y(\gamma\sin\delta + \alpha\beta(1-\cos\delta)) + z(-\beta\sin\delta + \alpha\gamma(1-\cos\delta)),$$

$$y' = x(-\gamma\sin\delta + \beta\alpha(1-\cos\delta)) + y(\cos\delta + \beta^2(1-\cos\delta)) + z(\alpha\sin\delta + \beta\gamma(1-\cos\delta),$$

$$z' = x(\beta\sin\delta + \gamma\alpha(1-\cos\delta)) + y(-\alpha\sin\delta + \gamma\beta(1-\cos\delta)) + z(\cos\delta + \gamma^2(1-\cos\delta))$$

If the origins of both coordinate systems O, O' are different, the coordinates x', y' and z' must still be transformed linearly on the basis of the vector, which connects the origins.

As $\alpha$, $\beta$ and $\gamma$ are stored in the storage unit 24 along with the angle of rotation $\delta$ and the vector connecting the origins of the two coordinate systems is also stored, the coordinates of the individual object points or the image points corresponding to them can be calculated and stored as vehicle image data in the vehicle-specific coordinate system.

Figure 3:
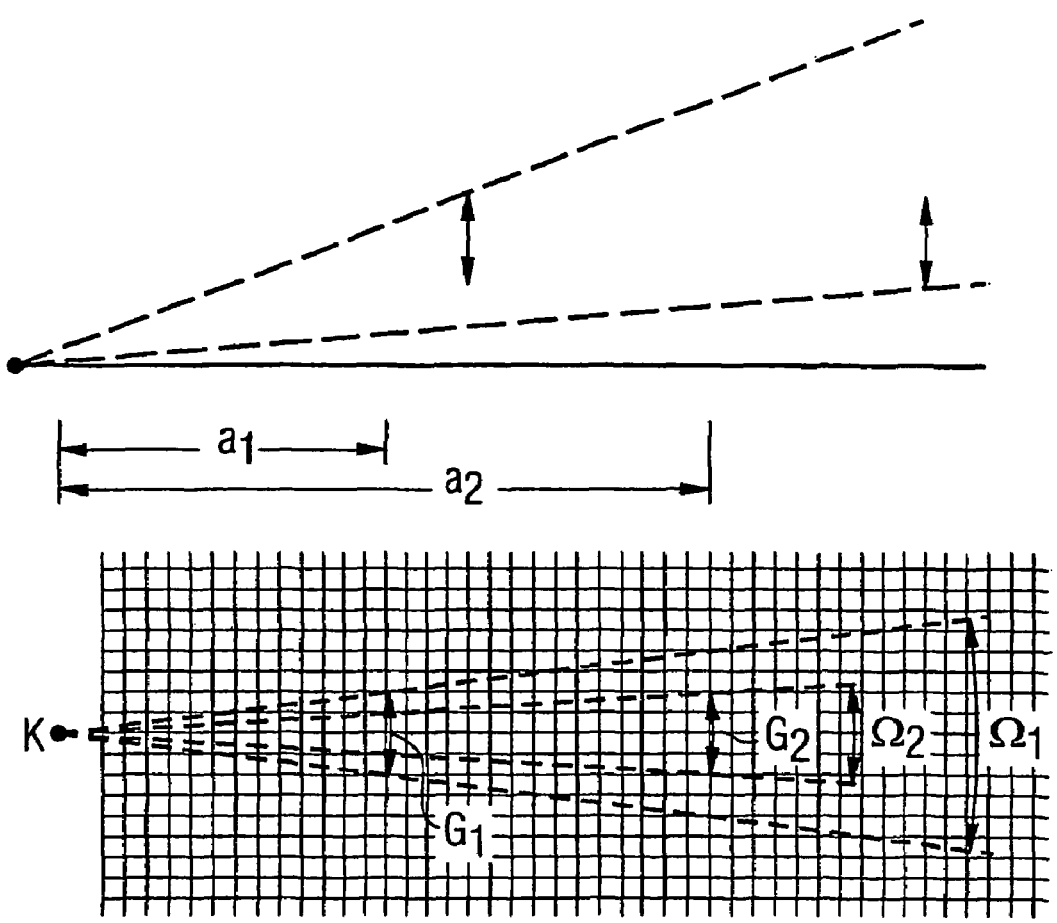
FIG. 3 is a schematic diagram to explain how image analysis, which is independent of the distance of an object from a camera, can be facilitated.

One problem, which arises with an analysis of the vehicle image data determined in this way, is as follows:

As shown in FIG. 3 the solid angle $\Omega$, at which a camera K sees an object G, depends on the latter's distance a. The bigger the distance, the smaller the solid angle. As a constant number of light sensors corresponds to every solid angle unit on a field with light sensors in a matrix contained in the electronic camera, the further the object is from the camera, the less image data results for the same object size. This can lead to problems when analyzing image data, for example classifying objects, as different image data quantities correspond to objects which are essentially the same in essence at different distances from the camera.

In the vehicle-specific coordinate system a point cloud corresponding to an object is more precise, as although its size remains the same as the distance from the camera changes, its point density decreases with increasing distance from the camera. In order to reduce this effect, which does not correspond to the actual conditions in the interior, the area of the interior recorded is subdivided into preferably equal-sized volume elements with each volume element being assigned the coordinates of its center point, for example. FIG. 3 shows volume elements two-dimensionally as a grid. This subdivision of the interior, i.e. the coordinates of the individual volume elements and their volumes, are for example stored in the storage unit 24. Each volume element here forms a "voxel" (volume picture element). The edges of the voxel are preferably parallel to the coordinate axes. The voxels are directly adjacent to each other and do not overlap. The length of their edges depends on the typical spatial resolution of the camera. The vehicle image data generated in the conversion unit 16, which assigns an image point in the form of a vector in the vehicle-specific coordinate system to each object point, is converted to voxel data in the voxel unit 18. The conversion may be accomplished by assigning a predetermined data value, for example a 1, to every volume element or voxel within which there is an object point, thus designating the voxel as containing an object point. The three-dimensional voxel image obtained in this way characterizes an object regardless of its distance from the camera, so that objective data analyses are possible, in which objects can be classified for example on the basis of their form.

The voxel image generated in the voxel unit 18 is analyzed in the analysis unit 20, for example by means of known pattern identification methods. The analysis allows the nature and spatial value of objects in the recorded interior, for example the head of a person, a child seat, etc. to be reliably identified and control signals to be generated for the control unit 26 after correlation with predetermined conditions (presence of a child seat, distance of the head of a person from the steering wheel, etc.) stored in the storage unit 24. In this way it is possible to activate and operate one or more occupant protection means 28, such as airbags, belt tensioners, etc. expediently for optimum occupant protection.

The device and analysis method described can be supplemented in a wide range of ways. For example predetermined vehicle points can be stored in the storage unit 24 with positions which are known in the vehicle-specific coordinate system. If these predetermined points are identified in the image, the transformation matrix can be determined from the coordinates of these predetermined points. These predetermined points can also be used for calibration purposes or for optimization purposes, with the option of optimizing the transformation matrix according to the smallest error square method by minimizing the sum of the discrepancy squares in the event of discrepancies between the stored object points and the transformed object points.

The image acquisition means-specific and the vehicle-specific coordinate systems do not necessarily have to be Cartesian coordinate systems. Both or one of them may be a polar coordinate system or a different three-dimensional coordinate system suitable for the relevant purposes.

"Voxel processing" may include counting every voxel element only once, for example accessed, when there is an object point within it Alternatively, "voxel processing" may also include assigning a value to every voxel element which is increased each time by one unit when there is an object point within the voxel element. In the first case a very effective smoothing is achieved. In the second case voxel elements with a higher number of object points are assigned a higher weighting.

It is evident that the angle of pivot is known in each instance for pivotable camera units accordingly, when all the image points of an object are indicated in a single, camera-specific coordinate system, the axis $g_1$ may, for example be the optical axis of the camera in the non-pivoted position. It may be advantageous to work in the first instance with polar coordinates in the camera-specific coordinate system and convert these to Cartesian, camera-specific coordinates before the transformation to the vehicle-specific coordinate system.

What is claimed is:

1. A method for determining whether the interior of a vehicle is occupied, wherein the vehicle defines a vehicle-specific coordinate system and wherein a memory includes reference vehicle points with known positions in the vehicle-specific coordinate system, said method comprising the steps of:
    acquiring a three-dimensional surface image of an area of the interior of the vehicle using an image acquisition device;
    generating image acquisition data depicting object points corresponding to image points of the surface image in an image acquisition coordinate system of the image acquisition device; and
    converting the image acquisition data to vehicle image data by identifying the vehicle points in the surface image and determining a conversion matrix to convert the image acquisition data to the vehicle-specific data using image acquisition data for the reference vehicle points, wherein the vehicle image data depicts the object points as vectors in the vehicle-specific coordinate system.

2. The method of claim 1, wherein the image acquisition coordinate system and the vehicle specific coordinate system are Cartesian coordinate systems.

3. A method for determining whether the interior of a vehicle is occupied, wherein the vehicle defines a vehicle-specific coordinate system and wherein a memory includes reference vehicle points with known positions in the vehicle-specific coordinate system, said method comprising the steps of:
    acquiring a three-dimensional surface image of an area of the interior of the vehicle using an image acquisition device;
    generating image acquisition data depicting object points corresponding to image points of the surface image in an image acquisition coordinate system of the image acquisition device; and
    converting the image acquisition data to vehicle image data by:
        identifying the vehicle points in the surface image and determining a conversion matrix to convert the image acquisition data to the vehicle-specific data using image acquisition data for the reference vehicle points; and
        minimizing the quadratic discrepancy in accordance with the smallest error square method when a discrepancy between the known coordinates of the reference vehicle points in the vehicle-specific coordinate system and the converted image acquisition data for the reference vehicle points of the generated image acquisition occurs,
    wherein the vehicle image data depicts the object points as vectors in the vehicle-specific coordinate system.

4. A method for determining whether the interior of a vehicle is occupied, wherein the vehicle defines a vehicle-specific coordinate system, said method comprising the steps of:
    breaking down the area of the vehicle to be detected by an image acquisition device into volume elements;
    acquiring a three-dimensional surface image of an area of the interior of the vehicle using an image acquisition device;
    generating image acquisition data depicting object points corresponding to image points of the surface image in an image acquisition coordinate system of the image acquisition device;
    assigning a first value to ones of the volume elements which include no image points of the image acquisition data;
    assigning a second value to other ones of the volume elements which include at least one image point of the image acquisition data; and
    converting the image acquisition data to vehicle image data, wherein the vehicle image data depicts the object points as vectors in the vehicle-specific coordinate system.

5. An apparatus for determining whether the interior of a vehicle is occupied, the vehicle defining a vehicle specific coordinate system, said apparatus comprising:
    an image acquisition device fitted in the interior of a vehicle for acquiring image data in an area of a vehicle interior, the image acquisition device having an image acquisition coordinate system;
    a voxel unit which divides the interior of the vehicle into volume elements, assigns a first value to ones of the volume elements which include no image points of the image data, and assigns a second value to other ones of the volume elements which include at least one image point of the image data;
    an image acquisition data generation unit connected to said image acquisition device for receiving the image data and generating image acquisition data depicting each image point of the image data as a vector in the image acquisition coordinate system of the image acquisition device; and
    a conversion unit for converting the image acquisition data to vehicle image data which depicts each image point of the image data as a vector in the vehicle-specific coordinate system.

6. The apparatus of claim 5, further comprising an analysis unit for analyzing the values assigned to said volume elements and generating control signals for a control unit of an occupant protection system in response to the values.

7. The apparatus of claim 5, further comprising an analysis unit for analyzing the vehicle image data and generating control signals for a control unit of an occupant protection system in response to the analysis.

* * * * *